INVENTORS
HENRY EHRENS
SIDNEY WEINER

United States Patent Office 3,188,429
Patented June 8, 1965

3,188,429
MOTOR STARTING RELAY WITH INITIALLY PARTIALLY SHUNTED OVERLOAD CONTROL
Henry Ehrens and Sidney Weiner, Cresskill, N.J., assignors to Sealed Unit Parts Co., Inc., New York, N.Y., a corporation of New York
Filed July 31, 1963, Ser. No. 298,910
10 Claims. (Cl. 200—113)

This invention relates to starting relays for motors having starting and running windings and, more particularly, to a novel relay of this type including a starting winding disconnect switch means, an overload responsive disconnect switch means, and means for effectively shunting such latter disconnecting switch means during the time the starting winding is connected in circuit, the relay of the invention further including means for effecting positive return of both the start and the overload disconnect switch means to the start or closed position, responsive to interruption of current flow.

Starting relays for motors of the type including a starting winding and a running winding, and in which the starting winding is disconnected once the motor has come to speed, frequently include a thermomotive element, such as a bimetallic strip, effective to disconnect the starting winding after a predetermined time interval, and a second thermomotive element, such as a bimetallic strip, effective to disconnect the motor from the line upon occurrence of overload. Both of these thermomotive elements should, for best design and for most efficient operation, have different sensitivities correlated with the respective duties thereof. Thus, the thermomotive or bimetallic element controlling the starting winding should have a sensitivity such that, after only a short predetermined interval, such as a few seconds, it will operate to disconnect the starting winding from the line. On the other hand, the thermomotive element controlling disconnection of the motor from the line upon occurrence of overload should have a sensitivity determined by, and relatively adjustable with respect to, the desired current at which it will operate to disconnect the motor from the line.

A difficulty encountered is that there is a relatively heavy current surge during starting of the motor. If the overload responsive bimetallic strip is subjected to this heavy current surge, which may be of the order of, or much greater than, the overload current, it will automatically "kick out" upon starting of the motor. Consequently, compromises have had to be made in the sensitivity of the thermomotive element controlling the disconnection of the motor upon occurrence of overload. Specifically, in order that the overload responsive thermomotive strip will not "cut out" the motor responsive to the starting current surge, it has to be made less sensitive than would otherwise be the case if it were subjected only to the normal running current of the motor, and operating only upon occurrence of an overload of a value above a preselected amount.

Still another problem encountered in the design of such relays has been that of returning both the starting winding thermomotive control switch and the overload responsive thermomotive control strip to the starting position after the motor has been disconnected from the line by occurrence of an overload. Various arrangements have been proposed for this purpose, but none have been completely satisfactory. Among the difficulties encountered in this respect, has been that of maintaining the starting winding thermomotive or bimetallic strip in the position maintaining the starting winding disconnected from the line. Naturally, when current flow is interrupted through the starting winding bimetallic strip, the latter will tend to cool and return to a position reconnecting the starting winding to the line. Arrangements used to prevent this, in known relays, have not been very satisfactory in operation.

Motors of this type, controlled by the mentioned type of starting relays, are frequently used in refrigeration and air conditioning systems where a motor is turned on and off in response to a temperature control. The present starting relay is also particularly adaptable for use in refrigeration or air cooling systems, but its use is by no means limited thereto as it may be used generally as an all-purpose motor starting relay.

In accordance with the present invention, it has been found that a properly sensitive overload control may be provided if means are provided in the relay for shunting at least the major portion of the starting current from the overload responsive thermomotive means during starting of the motor, so that the overload responsive means is not subjected to the relatively heavy starting current or, at least, is subjected to only a small portion thereof. This may be done by connecting a bypass shunt directly from the starting winding thermomotive control to the terminal for the running winding. This bypass thus conducts the major portion of the starting current directly from the bimetallic strip, controlling the starting winding, to the running winding, and in shunt relation with the overload responsive bimetallic strip.

When the thermomotive strip controlling the starting winding deflects to disconnect the starting winding from the line terminal, the running current of the motor flows through at least a portion of the starting winding thermomotive strip to the running winding thermomotive strip, and essentially through the entire length of the latter. This maintains a reduced current flow through the starting winding thermomotive or bimetallic strip, to maintain the starting winding disconnected from the line terminal. Toggle means preferably are provided so that once one of the bimetallic strips has snapped to a disconnect position, it passes dead center and is maintained in the disconnect position until it has cooled sufficiently to overcome the force of the toggle means.

In accordance with the invention, a mechanical connection is provided between the bimetallic strip controlling the starting winding and the overload current responsive bimetallic strip. Thereby, upon occurrence of an overload and movement of the bimetallic strip controlling the current to the running winding to a position disconnecting the running winding from the line terminal, the current flow through the bimetallic strip controlling the starting winding is interrupted and the latter will cool. As the latter cools and returns to its initial or starting position, the mechanical means interconnecting the two strips likewise snaps the overload control strip back to its initial position so that the motor is ready for restarting.

The invention relay further includes an additional bimetallic strip in parallel connection with the starting winding control strip to afford an additional control for the amount of current flowing through the starting winding bimetallic control strip, this additional thermomotive or bimetallic strip having a contact on its free end engaged by a contact on the starting winding control strip when the latter is snapped to a position disconnecting the starting winding from the line terminal. Independent adjustment means are provided for all three thermomotive or bimetallic strips, whereby the position or the point at which they will disconnect or connect associated contacts may be readily and easily pre-set and maintained. Ambient temperature compensating means are also provided in association with each of the starting winding control overload control strips so as to maintain the operation of these two elements substantially independent of the ambient temperature.

For an understanding of the principles of the invention, reference is made to the following description of a typical embodiment thereof as illustrated in the accompanying drawing. In the drawing.

Figure 1:
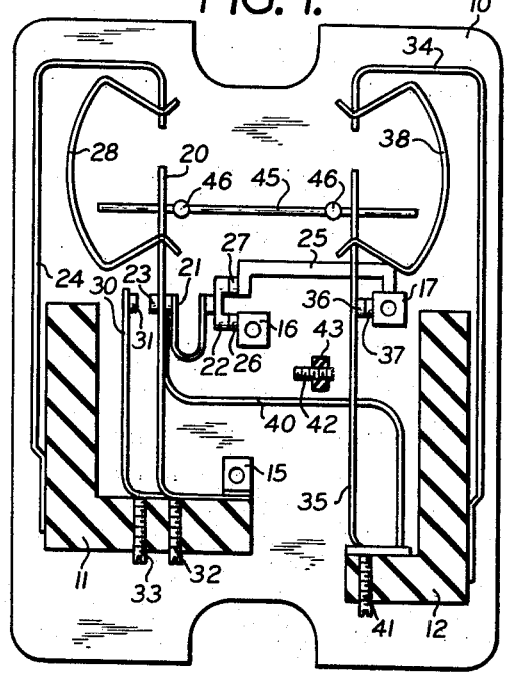
FIG. 1 is a front elevational view of a relay embodying the invention, showing the parts in advance of starting of the motor.

Referring to the drawings, the relay includes a base 10 on which are a pair of dielectric supports 11 and 12. Base 10 also preferably is made of dielectric material. A line terminal 15 is mounted on support 11, and a starting winding terminal 16 and a running winding terminal 17 are mounted directly on base 10. Terminal 15 is connected to one side of the source of potential, terminal 16 is connected to the motor starting winding and terminal 17 is connected to the motor running winding. The other common connection of the starting and running windings of the motor is connected to the other side of the source of potential, and usually a control switch, such as, for example, a temperature responsive switch is included in the connections between the relay and the source of potential.

The automatic control means for the starting winding comprises a bimetal strip 20 which has a bent fixed end mechanically secured to support 11 and electrically connected to line terminal 15. Intermediate its ends, and nearer to its free end, strip 20 has electrically and mechanically secured thereto a U-shaped spring connector 21 which carries, at its free end, contact means in the form of a double contact 22. Spring 21 extends from one surface of strip 20. Opposite the point of attachment of spring 21 to strip 20, a contact 23 is electrically and mechanically connected to the opposite surface of strip 20.

Double contact 22 is normally engaged with a contact 26 electrically connected to starting winding terminal 16 and with a contact 27. A bypass strip 25, of conductive metal, electrically connects contact 27 to running winding terminal 17. An ambient temperature compensating strip 24 has one end secured to support 11 and has a depending end facing the upper end of bimetal strip 20. A bowed toggle spring 28 mechanically interconnects the free end of bimetal 20 and the free end of temperature compensating strip 24. The action of toggle spring 28 is such that, when the end of strip 20 passes dead center in either direction, the toggle spring will snap bimetallic strip 20 in the direction which is then moving and to its limit of movement in that direction.

A control bimetallic strip 30, for operative association with the bimetal strip 20, has a bent fixed end connected to support 11 and electrically connected to line terminal 15. Control bimetallic strip 30 carries a contact 31 facing contact 23 on bimetallic strip 20, and contacts 23 and 31 are engaged when bimetallic strip 20 moves to disengage double contact 22 from contacts 26 and 27.

A running winding overload control is provided in the form of a third bimetallic strip 35, which has a bent and fixed end mechanically secured to support 12. Intermediate its ends, and nearer its free end than its fixed end, strip 35 carries a contact 36 which is normally engaged with contact 37 electrically connected to running winding terminal 17. An ambient temperature compensating bimetallic strip 34 has a fixed end secured to support 12 and a free end which is downturned for alignment with the free end of bimetallic strip 35. A bowed toggle spring 38 interconnects the free ends of strips 34 and 35. When strips 35 passes beyond dead center in either direction, the toggle spring 38 will snap the strip 35 in that direction to its limit of movement.

An electrical conductor 40 has one end electrically connected to bimetallic strip 20 adjacent spring 21, and its other end connected to the fixed end of bimetallic strip 35. For a purpose to be described, a stiff rod 45, which may be made of dielectric material, is loosely slidable through apertures in strips 20 and 35 adjacent the free ends thereof. Beads 46 are secured to or formed on rod 45 inwardly of the strips 20 and 35, but spaced only a short distance therefrom.

Adjusting screws 32 and 33 are threaded through support 11 and are respectively in engagement with bimetallic strips 20 and 30, these adjustment screws controlling the initial setting of these bimetallic strips and the sensitivity thereof. The initial setting and sensitivity of adjustment of bimetallic strip 35 is effected by an adjustment screw 41 threaded through the support 12. Limit of movement of strip 35 in the circuit breaking direction is determined by an adjusting screw 42 threaded through a bracket 43 on base 10.

Figure 2:
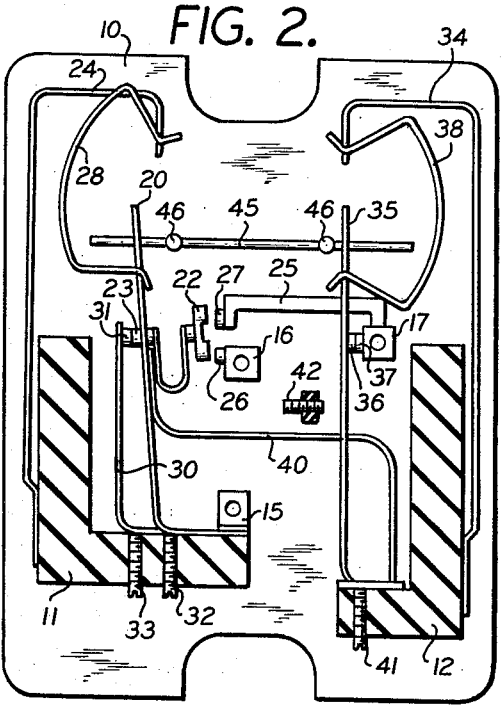
FIG. 2 is a view similar to FIG. 1 illustrating the parts with the motor running and the starting winding disconnected.

The invention relay operates in the following manner. The initial position of the parts is indicated in FIG. 1, wherein double contact 22 is in engagement with contacts 26 and 27, and overload contacts 36 and 37 are in engagement, these also being termed the running winding contacts. Upon application of an operating potential to line terminal 15, current will flow from this line terminal through bimetal 20 and spring 21 to double contact 22. The current will then flow from contact 26 to starting winding terminal 16 and from contact 27 through bypass strip 25 to running winding terminal 17. Some current will also flow through conductor 40 from strip 20 to the fixed end of strip 35, but this will be only a very minor fraction of the current flowing through the bypass strip 25. Consequently, the heavy starting current surge essentially all bypasses the overload control bimetal 35. After a predetermined time interval, usually a very few seconds, strip 20 heats sufficiently to deflect and to disengage contacts 22 from contacts 26 and 27. A bimetallic strip 20 passes deadcenter, toggle spring 28 snaps it to the position shown in FIG. 2, wherein double contact 22 is disengaged from contacts 26 and 27, and contacts 23 and 31 are engaged. The starting winding is now disconnected from line terminal 15.

Current now flows from line terminal 15 through strip 20, conductor 40 and through the major part of the length of bimetal 35, so that bimetal 35 is subjected to the running current of the motor. It will be noted that the running current also flows through a portion of the bimetallic strip 20, to maintain this bimetallic strip heated and thus deflected to the position of FIG. 2. The running current of the motor also passes through the bimetallic strip 30 and through the contacts 31 and 33 and thence through strip 20 and conductor 40 to strip 35. The strip 30 warps in a direction opposite to the direction of warping of the bimetallic strip 20, and thus prevents excessive warping of the strip 20.

Due to the bypass arrangement 25, the initial surge of starting current essentially bypasses bimetal 35, so that this strip need not be designed to handle the starting current. Accordingly, it can be designed with a sensitivity solely related to its function as an overload control. Also, due to the toggle 28 and the maintenance of the running current flow through a part of bimetal 20, the latter is prevented from prematurely returning to the position of FIG. 1, and will only return to this position after the current flow to line terminal 15 is interrupted, or when bimetal 35 has operated, on overload, to disengage contacts 36 and 37.

Figure 3:
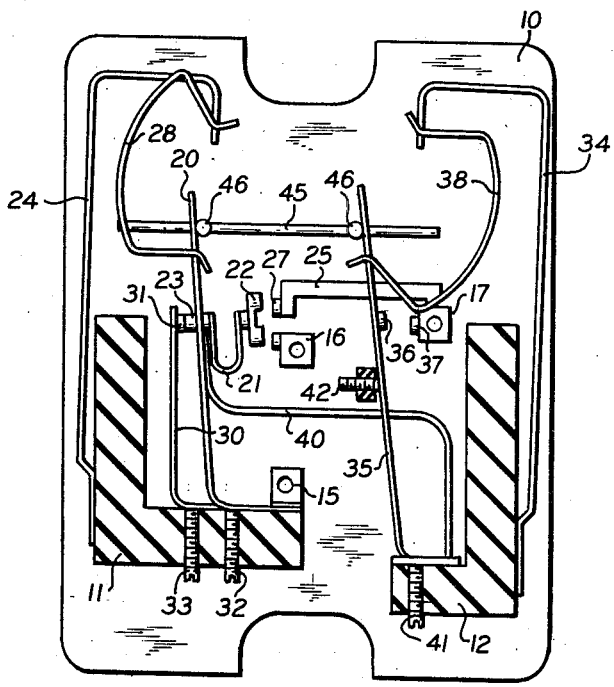
FIG. 3 is a view similar to FIGS. 1 and 2 illustrating the position of parts upon occurrence of an overload.

The condition upon overload is illustrated in FIG. 3. When the current exceeds a predetermined value, which can be sensitively set by proper adjustment of bimetal 35 and by proper design of the constants thereof, bimetal 35 will snap to the left from the position of FIG. 2, this snapping being aided by toggle spring 28 which, once bimetal 35 has moved off deadcenter to the left, will immediately snap the bimetal into engagement with adjusting screw 42. This separates contacts 36 and 37 interrupting current flow to the motor, and also interrupting the current flow through bimetals 20, 30 and 35. Bimetal 20 now rapidly cools and snaps back, with the aid of toggle spring 28, to the position of FIG. 1. In doing so, it engages the left-hand bead 46 and moves the rod 45 to the right. The right-hand bead 46 will thereupon move bimetal 35 to the right past the deadcenter position where the toggle spring 38 will snap bimetal 35 to a position reengaging contacts 36 and 37. Thus there is a positive and simultaneous return of start bimetallic strip 20 and overload bimetallic strip 35 to the start positions thereof.

Due to the fact that part of the running current of the motor passes through bimetal 30, excessive warpage of bimetallic strip 20 is prevented. It should be noted that the adjusting screw 42 regulates the point from which bimetal strip 35 has to return to the position of FIG. 1. Once this bimetal strip deflects, responsive to an overload, it cannot snap back on its own accord.

The features of the relay may be summarized as including means for preventing overheating of start bimetal 20, the highly sensitive overload protection provided by bimetallic strip 35, and the positive return of start bimetal 20 and overload bimetal 35 simultaneously to the start positions.

While a specific embodiment of the invention has been shown and described in detail to illustrate the application of the principles of the invention, it will be understood that the invention may be embodied otherwise without departing from such principles.

What is claimed is:

1. A starting and overload relay for a motor having a starting winding and a running winding, said relay comprising in combination, dielectric base means; a line terminal, a starting winding terminal and a running winding terminal on said base means; first thermomotive means electrically connected to said line terminal and initially connecting said starting winding terminal to said line terminal, said first thermomotive means, after a predetermined interval of heating by current flow therethrough, disconnecting said starting winding terminal from said line terminal; second thermomotive means normally connecting said running winding terminal to said line terminal through said first thermomotive means and operable, upon heating due to an overload current, to disconnect said running winding terminal from said line terminal; means operable, in the initial position of said first thermomotive means, to complete a bypass circuit for said second thermomotive means and connecting said running winding terminal to said line terminal through said first thermomotive means; means, including said second thermomotive means, operable upon said first thermomotive means disconnecting said starting winding terminal from said line terminal, to maintain a flow of heating current through said first thermomotive means to maintain it in its disconnecting position; and means operable by said first thermomotive means and effective, upon cooling of said first thermomotive means for return to its initial position, to move said second thermomotive means to a position reestablishing a connection between said running winding terminal and said line terminal.

2. A starting and overload relay, as claimed in claim 1, in which said first and second thermomotive means comprise relatively elongated bimetallic strips anchored at one end to said base means and each having a movable free end spaced from said base means.

3. A starting and overload relay, as claimed in claim 2, including a third bimetallic strip anchored to said base means adjacent said first strip and having a movable free end adjacent the movable free end of said first strip and in the path of movement thereof as the latter deflects to disconnect said starting winding terminal from said line terminal; the fixed end of said third strip being electrically connected to said line terminal whereby, as said first strip engages said third strip, said third strip is connected in parallel with said first strip so that the current to said running winding terminal flows through said first and third strips in parallel to said second strip; the direction of deflection of said third strip being opposite to that of said first strip whereby said third strip will restrain excessive deflection of said first strip during heating thereof by current flow to said running winding terminal from said line terminals.

4. A starting and overload relay, as claimed in claim 2, in which said means operable by said first strip comprises a relatively elongated rod extending freely through apertures adjacent the free ends of said first and second strips, and abutment means on said rod between said first and second strips, the spacing between said abutment means being slightly less than the normal spacing between said strips; and first strip upon return to its initial position, engaging an abutment means to move said rod to engage the other abutment means with said second strip so that both strips are conjointly returned to their initial position.

5. A starting and overload relay, as claimed in claim 2, including a pair of toggle means each operatively connected to the free end of a respective one of said strips; each toggle means, upon movement of its respective strip in one direction, snapping said strip to its limit of movement in such one direction.

6. A starting and overload relay, as claimed in claim 5, including a pair of ambient temperature compensating bimetallic strips each having an end fixed to said base means; each toggle means interconnecting the movable free end of a respective compensating strip to the movable free end of a respective one of said bimetallic strips.

7. A starting and overload relay, as claimed in claim 2, including an abutment adjustably mounted on said base means and engageable with said second bimetallic strip, upon deflection thereof responsive to overload, to limit the deflected position thereof.

8. A starting and overload relay, as claimed in claim 3, including adjustment means equal in number to said strips, and each adjustably mounted in said base means and engageable with the fixed end of a respective strip to adjust the initial position of the associated strip.

9. A starting and overload relay for a motor having a starting winding and a running winding, said relay comprising, in combination, dielectric base means; a line terminal, a starting winding terminal and a running winding terminal on said base means; a first thermomotive electrically conductive strip having one end fixed to said base means and electrically connected to said line terminal; a second thermomotive electrically conductive strip having one end fixed to said base means; a first fixed contact electrically connected to said starting winding terminal; a second fixed contact electrically connected to said running winding terminal; first contact means on said first strip and spaced from the fixed end thereof and normally engaged with both said first and second fixed contacts; a third fixed contact electrically connected to said running winding terminal; second contact means on said second strip and spaced from its fixed end, and normally engaged with said third fixed contact; a conductor connecting said first contact means to said fixed end of said second strip; whereby, upon connection of said line terminal to a source of potential, current will flow through said first strip and said first contact means to said first and second fixed contacts and thence to said starting and running winding terminals, the initial current flow substantially bypassing said second strip; said first strip, after a predetermined heating time interval due to the current flow therethrough, deflecting to disengage said contact means from said first and second contacts to disconnect the starting winding terminal from the line terminal; the current flowing thereafter from said first contact means to said fixed end of said second strip and from there to said second contact means and to said third fixed contact, whereby the major portion of the length of said second strip is subjected to heating due to current flow therethrough to the running winding terminal; said second strip, upon excessive heating thereof due to overload, deflecting to disengage said second contact means from said third fixed contact to interrupt the current flow to said running winding terminal and through said first and second contact strips; said first strip, upon cooling thereof due to interruption of the current flow therethrough, deflecting to reengage said first contact means with said first and second fixed contacts; and means operable by said first strip and effective, upon return of said first strip to a position engaging said first contact means with said first and second fixed contacts, to move said second strip to reengage said second contact means with said third fixed contact.

10. A starting and overload relay, as claimed in claim 9, in which said first contact means is mounted on one surface of said first strip; third contact means on the opposite surface of said first strip at substantially the location of said first contact means; a third thermomotive electrically conductive strip having one end fixed to said base means and electrically connected to said line terminal and extending in substantially parallel relation to the opposite surface of said first strip; and fourth contact means on said third strip positioned for engagement by said third contact means upon deflection of said first strip to disengage said first contact means from said first and second fixed contacts; whereby said first and third contact strips are connected in parallel for flow of current from said line terminal to said second strip and through the latter to said running winding terminal; said third contact strip being biased to deflect, upon heating, in a direction opposite to the deflection direction of said first contact strip to restrain said first contact strip against excessive deflection during such flow of current to said running winding terminal.

No references cited.

BERNARD A. GILHEANY, *Primary Examiner.*